E. M. STANLEY.
CAMERA.
APPLICATION FILED JULY 17, 1916.

1,263,619.

Patented Apr. 23, 1918.

Inventor
E. M. STANLEY

Milton S. Crandall,
Attorney

E. M. STANLEY.
CAMERA.
APPLICATION FILED JULY 17, 1916.

1,263,619.

Patented Apr. 23, 1918.
3 SHEETS—SHEET 2.

Inventor
E. M. STANLEY
Milton S. Crandall
Attorney

E. M. STANLEY.
CAMERA.
APPLICATION FILED JULY 17, 1916.

1,263,619.

Patented Apr. 23, 1918.
3 SHEETS—SHEET 3.

Inventor
E. M. STANLEY

Milton L. Crandall,
Attorney

UNITED STATES PATENT OFFICE.

ELLIOTT MORRELL STANLEY, OF CHUGWATER, WYOMING.

CAMERA.

1,263,619.  Specification of Letters Patent.  Patented Apr. 23, 1918.

Application filed July 17, 1916. Serial No. 109,781.

*To all whom it may concern:*

Be it known that I, ELLIOTT M. STANLEY, a citizen of the United States, and a resident of Chugwater, in the county of Laramie and State of Wyoming, have invented certain new and useful Improvements in Cameras, of which the following is a specification.

The present invention relates to cameras. The invention has for its primary object the production of a camera embodying improved means whereby any desired portion of a film or other sensitized element may be exposed, making it possible to take several views on the portion of the sensitized element upon which but one view is ordinarily taken.

A further object of the invention is the production of a camera embodying simplified and efficient means for accurately regulating the size of the portion of the sensitized element which is to be exposed.

A still further object of the invention is the production of an improved means more particularly adapted for use upon roll film cameras for regulating the size of the pictures.

Still another object is the production in a device of this sort of improved means for indicating the exposed and unexposed portion of the sensitized element. Furthermore the invention contemplates a device including an improved means for indicating the exposed and unexposed portions of the sensitized element, and a view finding mechanism which operates in conjunction therewith.

With these and other objects in view, the invention, consisting in the construction, combination and novel arrangements of parts, will be fully understood from the following description, reference being had to the accompanying drawings which form a part of this application, and in which like characters of reference indicate corresponding parts throughout the several views, of which,—

Figure 1:
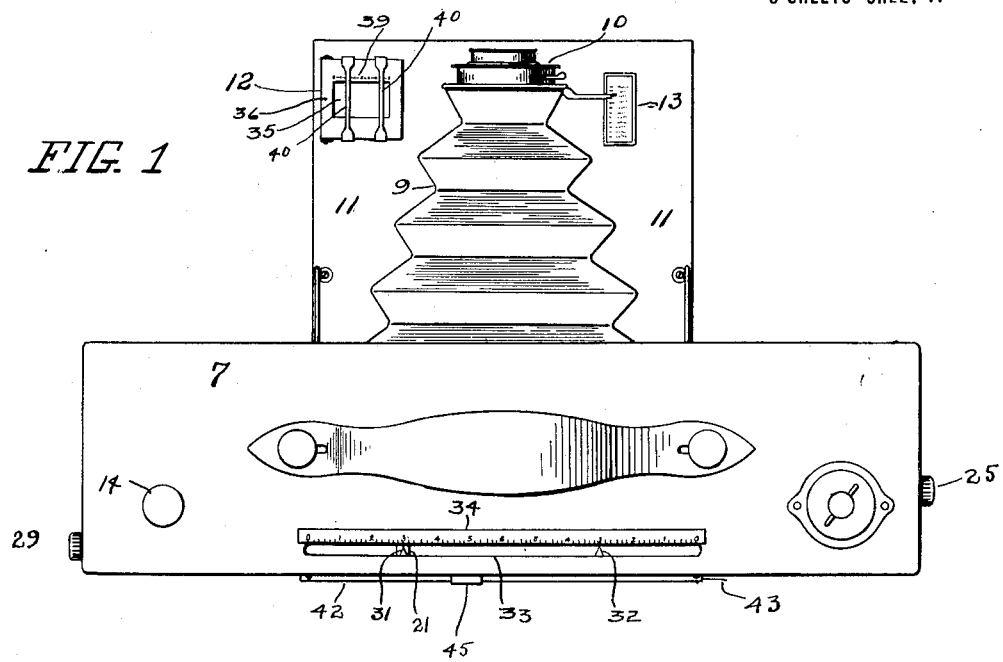
Figure 2:
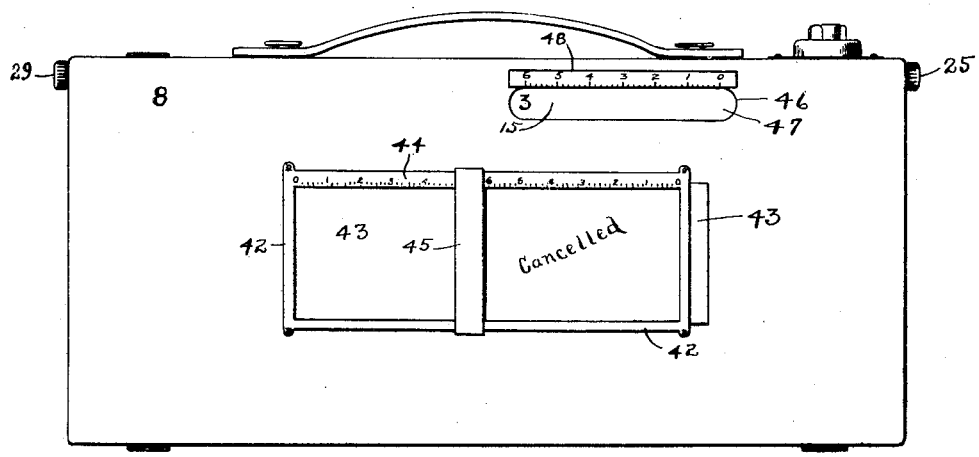
Figure 4:
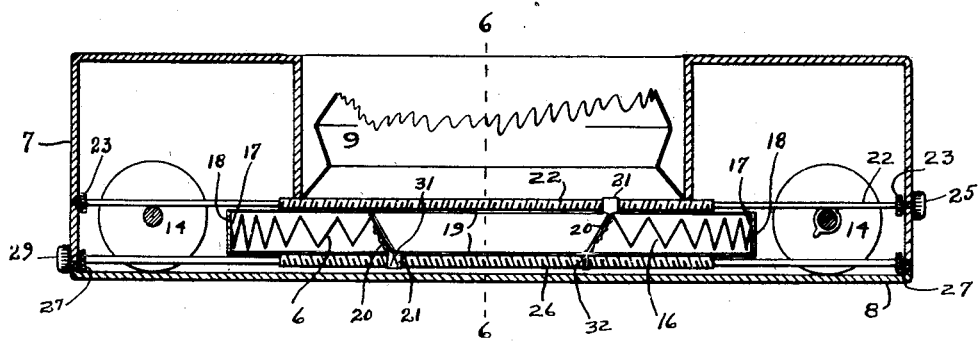
Figure 3:
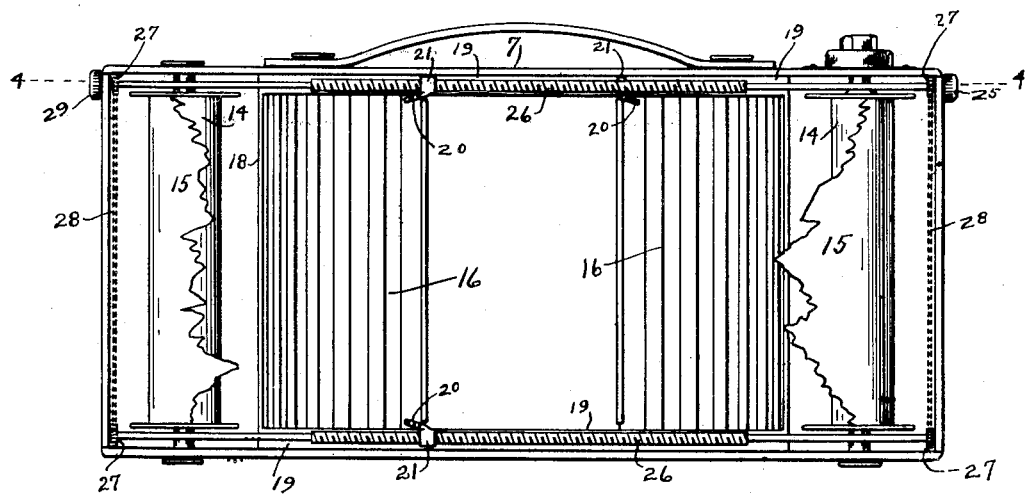
Figure 5:
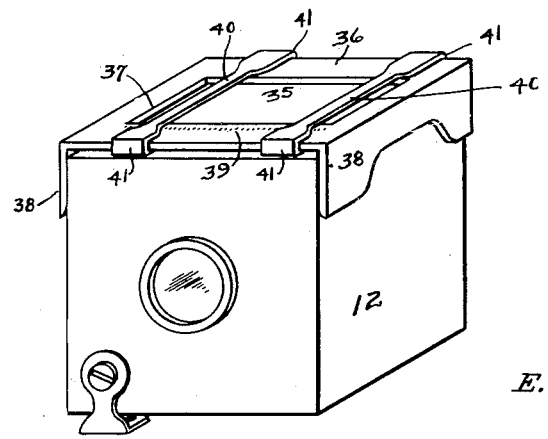
Figure 6:
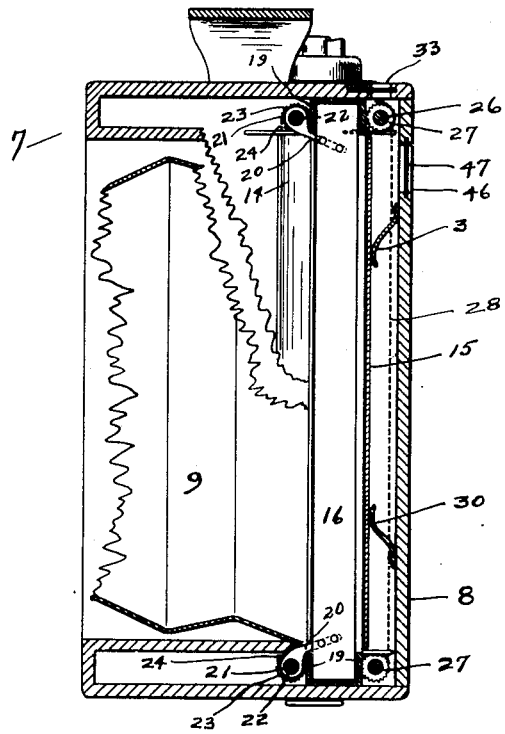
Figure 7:
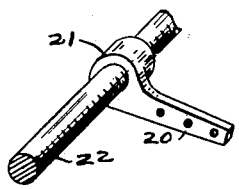

Figure 1 is a plan of a camera constructed in accordance with the invention; Fig. 2 is a rear elevation of the same; Fig. 3 is a rear elevation of the same, with the cover removed and the film cut away to reveal the internal characteristics; Fig. 4 is a horizontal section taken on the line 4—4 of Fig. 3; Fig. 5 is an enlarged isometric view of the view finder; Fig. 6 is a vertical transverse section taken on the line 6—6 of Fig. 4 and Fig. 7 is an enlarged fragmentary perspective view of one of the curtain-controlling shafts and one of the armed collars.

I have illustrated and hereinafter described the preferred embodiment of the invention, as applied to a roll film type of camera, yet I would not be understood as being limited to the specific structure chosen for illustration, for it will be evident from the description that various alterations and modifications in the details of construction and arrangement of parts may be made without departing from the spirit and scope of the invention, as defined in the appended claims.

Referring now to the illustrations, 7, represents the familiar case of a roll-film camera, having a removable back 8, and bellows, 9, carrying the lens and shutter case, 10. 11, is the usual door upon which is mounted the view finder 12, the focus scale, 13; and which supports the bellows, when the lens is extended.

On opposite sides and within the case are the usual film rollers, 14, upon which the film, 15 is wound. In the rear of the bellows and in front of the sensitized element, 15 are curtains, 16 which are extensible and retractable toward and from each other.

In the present embodiment, the said curtains are bellows-like and have their outermost ends fixed, as at 17, to upright strips, 18, the corresponding ends of which are interconnected by horizontal strips, 19, between which the upper and lower edges of the curtain extend, whereby the strips 19, serve as guards to prevent the entrance of light under and above the curtain. To the innermost ends, or leaves of the curtains are secured upper and lower arms, 20, provided with collars, 21. The arms on one of the curtains extend forwardly and the collars, thereof, are threaded on upper and lower horizontal shafts, 22; journaled for rotation in opposite sides of the case and provided with sprocket-wheels, 23, connected by sprocket-chains, 24. The uppermost of the shafts, 22, is provided on the outer side of the case, with a knurled knob, 25, for conveniently rotating the parts.

The arms on the other curtain are rearwardly disposed and the collars thereof, are similarly mounted on a pair of shafts, 26, carrying sprocket-wheels 27, connected by chains 28, and the uppermost of which latter shafts is provided with a controlling knob, 29.

The inner side of the back of the case is preferably provided with yieldable means, as the springs, 30, which engage and hold the sensitized element against the inner leaves of the curtains.

The rear upper collar, 21, and the rear end of the upper arm of the opposite curtain are provided with indicating pointers, 31 and 32, respectively, which are always visible through the slot, 33, in the top of the case as clearly presented in Fig. 1. Said slot may be covered with a translucent material commonly used in the art, for covering such openings. Upon the top of the case and adjacent the said slot, is mounted a graduated scale, 34, adjacent which the indicators 31 and 32 operate. The length of the said slot and scale correspond to the maximum width of the portion of the sensitized element which may be exposed.

By virtue of the structure now described, it is evident that by turning the controlling knobs, 25 and 29, each in opposite directions the curtains will be moved toward and from each other, and accordingly diminish and increase the width of the portion of the film which is exposed. The view finder, 12, consists of the usual cube-like box, having the customary lens, 35, in its upper side; and hingedly mounted on the door, 11, as usual, to permit its being tipped at right angles when views are taken with the camera turned on its end.

On the top of the view-finder I mount a plate, 36, having a rectangular opening, 37, therein, and provided with a side flange, 38, adapted to grip the sides of the view-finder. Adjacent the edge of the said rectangular opening the plate is provided with a graduated scale, 39, and extending transversely across the scale and said opening extend a pair of guide strips, 40, which are mounted to slide toward and from each other, their ends being bent around the edges of the plate, 36, as clearly shown at 41, in Fig. 5.

The units of graduation of the scale, 39, bear the same ratio to the length of the opening, 37, as do the units of the scale, 34, to the maximum view which may be taken. In order to conveniently record the parts of the portion, of the sensitized element, which have been exposed, I provide on the rear of the case a suitable frame, 42, between which and the case may be removably interposed a card or sheet, 43. On one edge of the said frame is a graduated scale, 44, the units of which bear the same ratio to the length of the scale as do the units of scale, 34, to the portion of the sensitized element in the rear of the bellows. Extending transversely across the scale and frame is slidably mounted a strip 45.

Assuming that the film is shifted from the roller at the left to the one at the right and that it is desired to take the first view one half the maximum width, the controlling knob, 25, is operated to move the curtain to the right until the indicator, 32, is at zero at the right of the scale, 34, and the other knob, 29, is then operated to extend the left curtain until the indicator, 31, stands coincident with "6" on the scale. With the curtain thus set it is evident that when the shutter is actuated only that portion of the film between the indicators, 31 and 32, will be exposed.

While locating the object in the view-finder, the guide strips, 40, are shifted to position on the scale, 39, to correspond to the points on the scale, 34, coincident with the indicators, 31 and 32, and the object located between the strips.

The portion of the film which has thus been exposed may now be recorded upon the sheet, 43, by shifting the sliding strip, 45 until the edge thereof, is coincident with "6" on the scale 44. A line may be drawn on the sheet, 43, coincident with the edge of the strip, 45, as shown in Fig. 2 and that portion of the sheet to the right of the line is canceled by marks, or otherwise, as shown, to indicate that the corresponding part of the portion of the film in the rear of the bellows has been exposed.

If the next view to be taken is to be, we will assume, one quarter size, the indicator, 31, is moved to the left coincident with "3" on the scale, 34, and the indicator, 32 to "6", and the view finder strips, 40, and the strips, 45 on the recording device are accordingly shifted.

Roll-film cameras are provided with ruby-covered round openings through which the view or plate numbers on the film may be seen. In the present embodiment, however, in order that the operator can intelligently adjust the film and take pictures, less than full size, repeatedly without shifting the curtains, I substitute for the usual round opening, a slot, 46, in the back of the camera, which is covered by a translucent material, 47. Adjacent the slot is mounted a scale, 48, corresponding to one-half the scale, 34.

Assuming, now, that a picture is taken with the curtains set as shown in Fig. 1, and the figure "3" on the film registers with "6" on the scale, 48, and that it is desired to take another picture without shifting the curtains, the film must be shifted six units, on until the figure "3" on the film is under "0" on the scale, since the width of the exposed portion of the film is six units.

It is evident that when pictures are taken with the camera turned on its end, that the camera is shifted vertically to position the views between the curtains. Therefore, after turning the view finder, as usual, the plate, 36, must be removed and replaced on the view-finder at right angles to the relative position shown in Fig. 5, whereby vertical movement of the camera shifts the image transversely of the guide strips, 40.

Having thus described my invention, what I claim as new and desire to secure by Letters Patent of the United States, is,—

1. A camera comprising a case adapted to receive a sensitized element, bellows-like curtains movable toward and from each other before said element and means for control of the curtains, including two pairs of threaded rods mounted adjacent the upper and lower edges of the curtains, one rod of each pair being extended from the case for rotation by the operator, driving connections between each rod and its mate, and traveling nuts on the rods secured to the edges of the curtains.

2. The combination with a camera including a case adapted to receive a sensitized element, and a view finder, of curtains movable before the sensitized element to regulate the size and position of the exposable portion of the said element, a graduated scale on the case, position indicating means movable in unison with the curtains adjacent the scale, a graduated scale on the view finder corresponding in ratio to said first scale, and position indicating means movable adjacent said second scale, whereby the view may be accurately positioned on the exposable portion of the sensitized element through the medium of the view finder.

3. A camera including a suitable case adapted to receive a sensitized element, a pair of extensible and retractable curtains operable toward and from each other adjacent the front of the sensitized element, means for controlling the curtains, position indicating members moved in unison with the curtains, the case having a slot to reveal said members, a graduated scale adjacent the edge of the slot, and means for receiving a record of the exposed and unexposed portions of the sensitized element, including a graduated scale mounted on the case, and an indicator movable longitudinally thereof, said scales being graduated in corresponding ratios.

4. A camera including a case adapted to receive a sensitized element, means extensible and retractable before said element to regulate the size of the exposable portion thereof, position indicating means including a graduated scale and an indicator therefor carried by said first means, and means for receiving a record of the exposed and unexposed portions of said element including a graduated scale mounted on the case and an indicator movable longitudinally thereof, said scales being graduated in corresponding ratios.

5. A camera including a case adapted to receive a sensitized element, means extensible and retractable before said element to regulate the size of the exposable portion thereof, position indicating means including a graduated scale and an indicator therefor carried by said first means, and means for receiving a record of the exposed and unexposed portions of said element including a record sheet holder mounted on the case and having a graduated scale corresponding, in ratio, to said first scale, and an indicator movable across the sheet holder and longitudinally of said second scale.

In testimony, whereof, I have hereunto set my hand.

ELLIOTT MORRELL STANLEY.